US007697765B2

(12) United States Patent
Matsugu et al.

(10) Patent No.: US 7,697,765 B2
(45) Date of Patent: Apr. 13, 2010

(54) LEARNING METHOD AND DEVICE FOR PATTERN RECOGNITION

(75) Inventors: Masakazu Matsugu, Chiba (JP); Pierre Cardon, Pau Cedex (FR)

(73) Assignee: Canon Kabushiki Kaisha, Tokyo (JP)

( * ) Notice: Subject to any disclaimer, the term of this patent is extended or adjusted under 35 U.S.C. 154(b) by 702 days.

(21) Appl. No.: 11/044,188

(22) Filed: Jan. 28, 2005

(65) Prior Publication Data
US 2005/0185835 A1 Aug. 25, 2005

(30) Foreign Application Priority Data
Jan. 29, 2004 (JP) ............................. 2004-021823

(51) Int. Cl.
*G06K 9/62* (2006.01)
(52) U.S. Cl. ..................... 382/225; 382/159; 706/20
(58) Field of Classification Search ............... 382/159, 382/158, 225, 118, 190, 128; 706/20
See application file for complete search history.

(56) References Cited

U.S. PATENT DOCUMENTS

| 5,740,274 | A  | * | 4/1998  | Ono et al.      | 382/190 |
|-----------|----|---|---------|-----------------|---------|
| 5,933,519 | A  | * | 8/1999  | Lee et al.      | 382/133 |
| 6,038,337 | A  |   | 3/2000  | Lawrence et al. | 382/156 |
| 6,081,620 | A  |   | 6/2000  | Anderholm       | 382/194 |
| 6,101,270 | A  | * | 8/2000  | Takahashi       | 382/158 |
| 6,208,758 | B1 | * | 3/2001  | Ono et al.      | 382/190 |
| 6,345,119 | B1 | * | 2/2002  | Hotta et al.    | 382/225 |
| 6,363,381 | B1 | * | 3/2002  | Lee et al.      | 707/6   |
| 6,728,404 | B1 | * | 4/2004  | Ono et al.      | 382/190 |
| 6,801,662 | B1 | * | 10/2004 | Owechko et al.  | 382/224 |
| 7,274,819 | B2 | * | 9/2007  | Matsugu         | 382/181 |
| 7,522,758 | B2 | * | 4/2009  | Ortyn et al.    | 382/133 |
| 2002/0038294 | A1 | * | 3/2002 | Matsugu      | 706/20  |
| 2002/0181765 | A1 | * | 12/2002 | Mori et al.  | 382/158 |
| 2006/0204053 | A1 | * | 9/2006  | Mori et al.  | 382/118 |

OTHER PUBLICATIONS

"Face Recognition: A Convolutional Neural Network Approach", IEEE Transactions on Neural Networks, Special Issue on Neural Networks and Pattern Recognition, 1997, vol. 8, No. 1, pp. 98-113.
M. Weber, et al., "Viewpoint-Invariant Learning and Detection of Human Heads", Proceedings of the 4th International Conference on Automatic Face and Gesture Recognition, 2000, pp. 20-27.

(Continued)

*Primary Examiner*—Daniel G Mariam
*Assistant Examiner*—Aklilu k Woldemariam
(74) *Attorney, Agent, or Firm*—Fitzpatrick, Cella, Harper & Scinto

(57) ABSTRACT

In learning for pattern recognition, an aggregation of different types of object image data is inputted, and local features having given geometric structures are detected from each object image data inputted. The detected local features are put through clustering, plural representative local features are selected based on results of the clustering, and a learning data set containing the selected representative local features as supervisor data is used to recognize or detect an object that corresponds to the object image data. The learning thus makes it possible to appropriately extract, from an aggregation of images, local features useful for detection and recognition of subjects of different categories.

16 Claims, 11 Drawing Sheets

OTHER PUBLICATIONS

I. Laptev, et al., Interest Point Detection and Scale Selection in Space-Time, Proceedings of Scale-Space Methods in Computer Vision Lecture Notes in Computer Science, 2003, pp. 372-387.

Y. LeCun, et al., "Convolutional Networks for Images, Speech, and Time Series", The Handbook of Brain Theory and Neural Networks, MIT Press, 1995, pp. 255-258.

K. Fukushima, et al., "Neocognitron: A New Algorithm for Pattern Recognition Tolerant of Deformations and Shifts in Position", Pattern Recognition, 1982, vol. 15, pp. 455-469.

M. Lades, et al., "Distortion Invariant Object Recognition in the Dynamic Link Architecture", IEEE Transactions on Computers, 1993, vol. 42, No. 3, pp. 300-311.

L. Sirovich, et al., "Low-dimensional Procedure for the Characterization of Human Faces", J. Optical Society of America, 1987, vol., 4, No. 3, pp. 519-524.

C. Schmid, et al., "Evaluation of Interest Point Detectors", International Journal of Computer Vision (2000), vol. 37, No. 2, pp. 151-172.

* cited by examiner

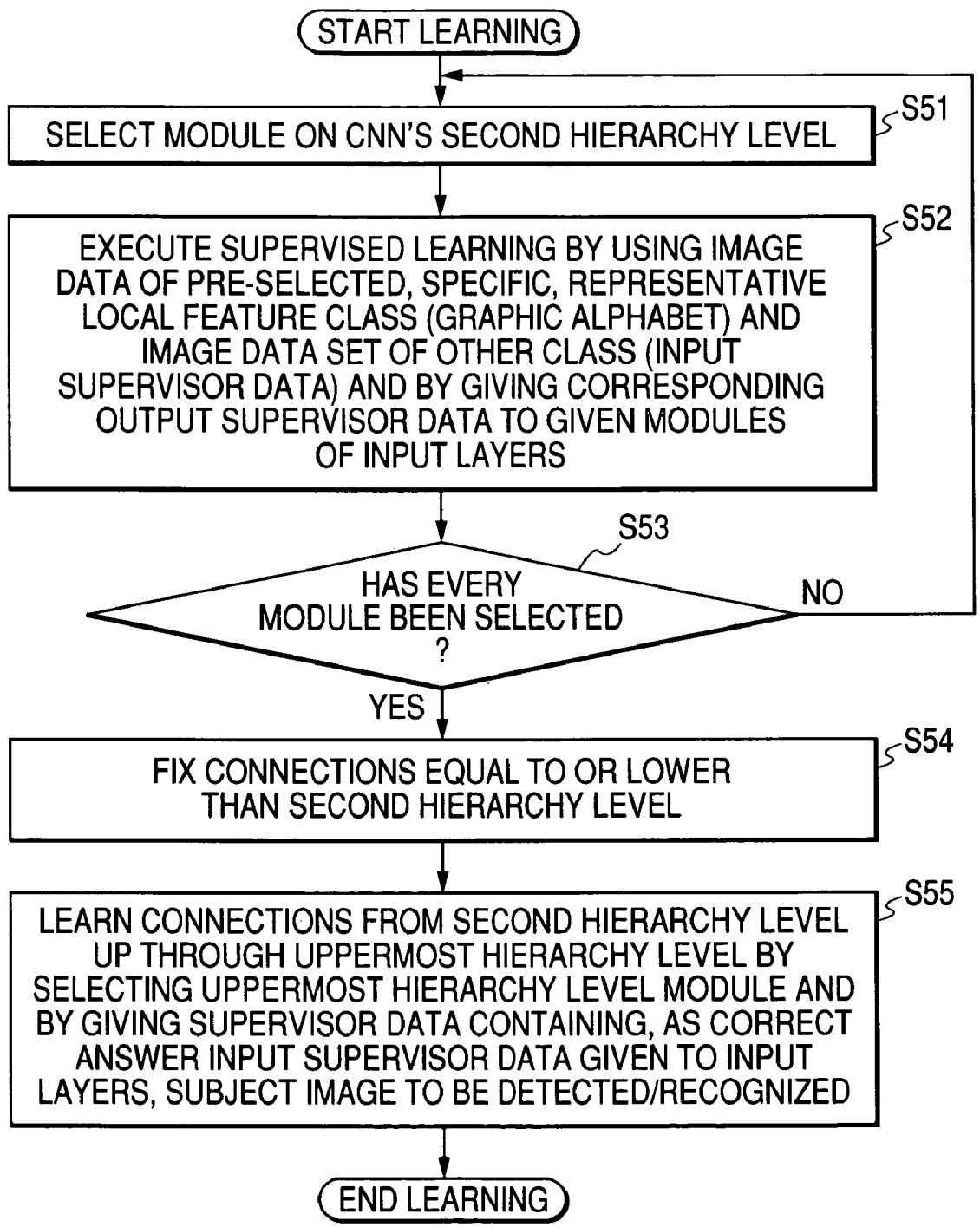

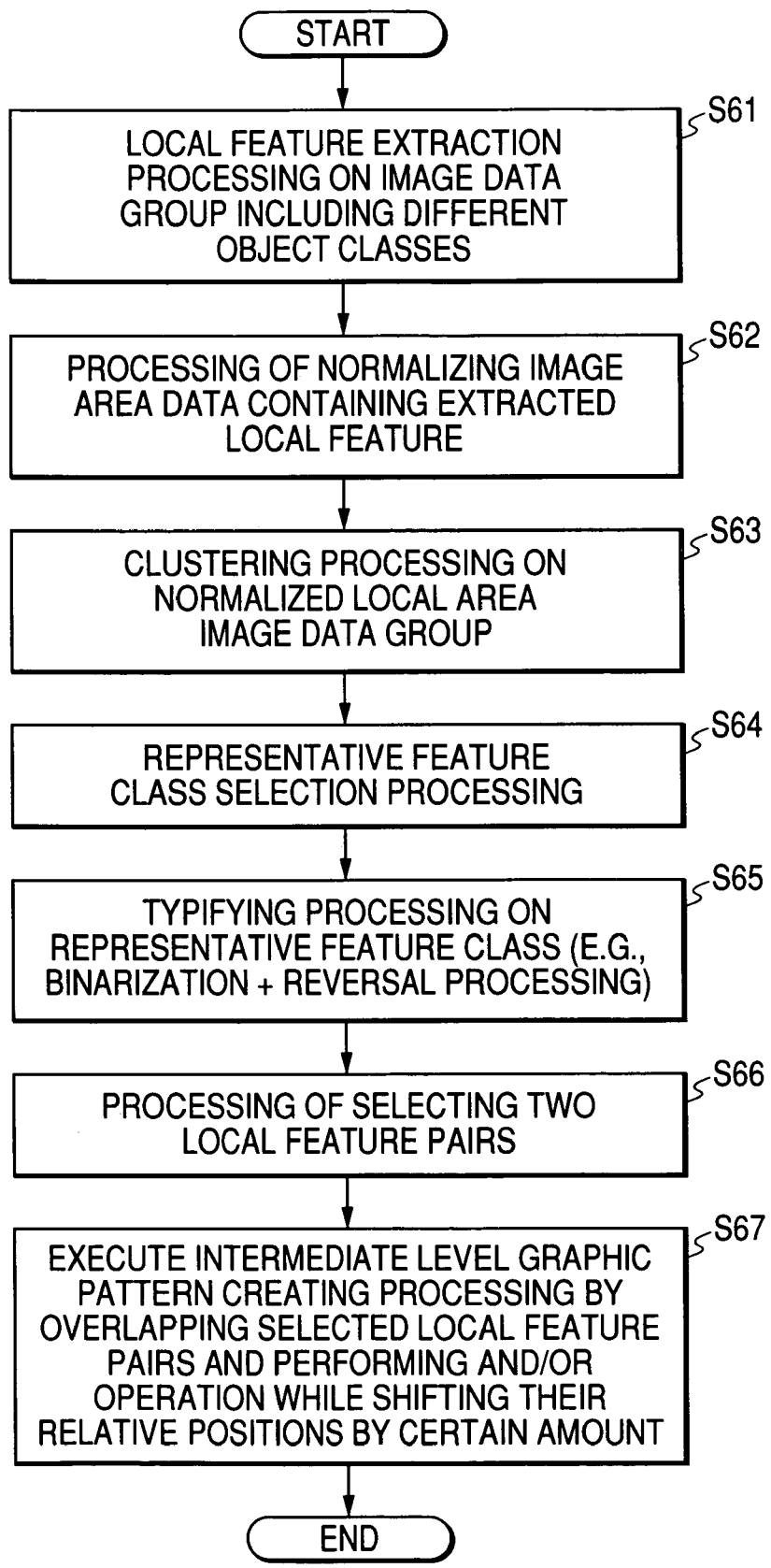

LEARNING METHOD AND DEVICE FOR PATTERN RECOGNITION

BACKGROUND OF THE INVENTION

1. Field of the Invention

The present invention relates to a learning method and device for pattern recognition, in particular, ones suitable for training to give a function of detecting and recognizing from image data faces, people, vehicles and other objects.

2. Related Background Art

In the field of image recognition, methods have been proposed to learn a feature amount necessary for detection of a subject to be recognized, and an example thereof is disclosed in M. Weber et al., "Viewpoint-Invariant Learning and Detection of Human Heads, Proceedings of fourth International Conference on Automatic Face and Gesture Recognition", 2000, p. 20-27. The technique disclosed in this document runs a so-called interest operator on an image to extract local feature points such as corners and line intersections, and then applies clustering by vector quantization such as the k-means method to extract a few, useful features.

The techniques disclosed in Sirovich et al., "Low-dimensional procedure for the characterization of human faces", J. Opt. Soc. Am. [A], 1987 vol. 3, p. 519-524 and Lades et al., "Distortion Invariant Object Recognition in the Dynamic Link Architecture", IEEE Trans. on Computers, 1993, vol. 42, p. 300-311 present examples of how to recognizes an image. The technique according to the former document recognizes an image by calculating a feature amount on the similarity with a model. Specifically, an input pattern is mapped onto a unique image function space, which is obtained through analysis on major components of a model image of a subject, to calculate the distance from the model in a feature space. The technique according to the latter document graphs results of feature extraction (feature vectors) as well as their spatial arrangement in relation to one another, and calculates the similarity through elastic graph matching to recognize an image.

Examples of a pattern recognition method using a neural network model which is inspired by the brain's mechanism of processing information include ones that involve hierarchical template matching (see, for example, M. Weber et al., "Viewpoint-Invariant Learning and Detection of Human Heads, Proceedings of 4th International Conference on Automatic Face and Gesture Recognition", 2000, p. 20-27 and Fukushima & Miyake, "Neocognitron: A new algorithm for pattern recognition tolerant of deformation and shift in position", Pattern Recognition, 1982, vol. 15, p. 455-469), ones that employ multilayer perceptron, and ones that use a radial basis function network.

The learning method according to M. Weber et al., "Viewpoint-Invariant Learning and Detection of Human Heads, Proceedings of 4th International Conference on Automatic Face and Gesture Recognition", 2000, p. 20-27 has a problem in that the extracted features, which are effective for specific subjects, may not be so for detection and recognition of subjects in other categories.

Also, none of the recognition algorithms according to Sirovich et al., "Low-dimensional procedure for the characterization of human faces", J. Opt. Soc. Am. [A], 1987 vol. 3, p. 519-524; Lades et al., "Distortion Invariant Object Recognition in the Dynamic Link Architecture", IEEE Trans. on Computers, 1993, vol. 42, p. 300-311; Fukushima & Miyake, "Neocognitron: A new algorithm for pattern recognition tolerant of deformation and shift in position", Pattern Recognition, 1982, vol. 15, p. 455-469; JP 60-712 B have quite succeeded in meeting demands that it be robust to a change in size, direction or the like of a subject to be recognized and that it be applicable to detection and recognition of subjects which are in different categories.

SUMMARY OF THE INVENTION

The present invention has been made in view of the above, and an object of the present invention is therefore to provide a method and device of learning for appropriately extracting, from an aggregation of images, local features useful for detection and recognition of subjects which are in different categories.

Another object of the present invention is to provide a learning method and device with which more intricate features obtained by combining extracted local features can be extracted appropriately.

Still another object of the present invention is to provide a learning method and device with which objects belonging to plural categories can efficiently be detected and recognized while receiving as little influence as possible from a change in a subject to be recognized.

According to one aspect, the present invention which achieves these objectives relates to a learning method for pattern recognition, including:

an image input step of inputting an aggregation of different types of object image data;

a local feature detection step of detecting local features that have given geometric structures from each object image data inputted in the image input step;

a clustering step of performing clustering on the local features detected in the local feature detection step;

a feature selection step of selecting plural representative features based on results of the clustering in the clustering step; and a learning step of learning for recognition or detection of an object that corresponds to the object image data with the use of a learning data set, which contains as supervisor data the representative local features selected in the feature selection step.

According to another aspect, the present invention which achieves these objectives relates to a learning device for pattern recognition, including:

image input means for inputting an aggregation of different types of object image data;

local feature detection means for detecting local features that have predetermined geometric structures from each object image data inputted by the image input means;

clustering means for performing clustering on the local features detected by the local feature detection means;

feature selection means for selecting plural representative features based on results of the clustering by the clustering means; and training means for training for recognition or detection of an object that corresponds to the object image data with the use of a learning data set, which contains as supervisor data the representative local features selected by the feature selection means.

According to another aspect, the present invention which achieves these objectives relates to a computer-readable program for controlling a computer to perform learning for pattern recognition, the program including codes for causing the computer to perform:

an image input step of inputting an aggregation of different types of object image data;

a local feature detection step of detecting local features that have predetermined geometric structures from each object image data inputted in the image input step;

a clustering step of performing clustering on the local features detected in the local feature detection step;

a feature selection step of selecting plural representative features based on results of the clustering in the clustering step; and a learning step of learning for recognition or detection of an object that corresponds to the object image data with the use of a learning data set, which contains as supervisor data the representative local features selected in the feature selection step.

Other objectives and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a flow chart illustrating an example of a learning procedure using local features according to a second embodiment of the present invention;

FIG. 6 is a flow chart illustrating an example of a procedure creating intermediate local features according to a third embodiment of the present invention;

FIG. 10 is a block diagram showing an example of the configuration of an image pickup device with a pattern recognition device built in.

DESCRIPTION OF THE PREFERRED EMBODIMENTS

Hereinafter, preferred embodiments of the present invention will be described with reference to the accompanying drawings.

First Embodiment

A detailed description is given below with reference to the drawings on a first embodiment of the present invention.

(Outline of Overall Configuration)

Figure 1:
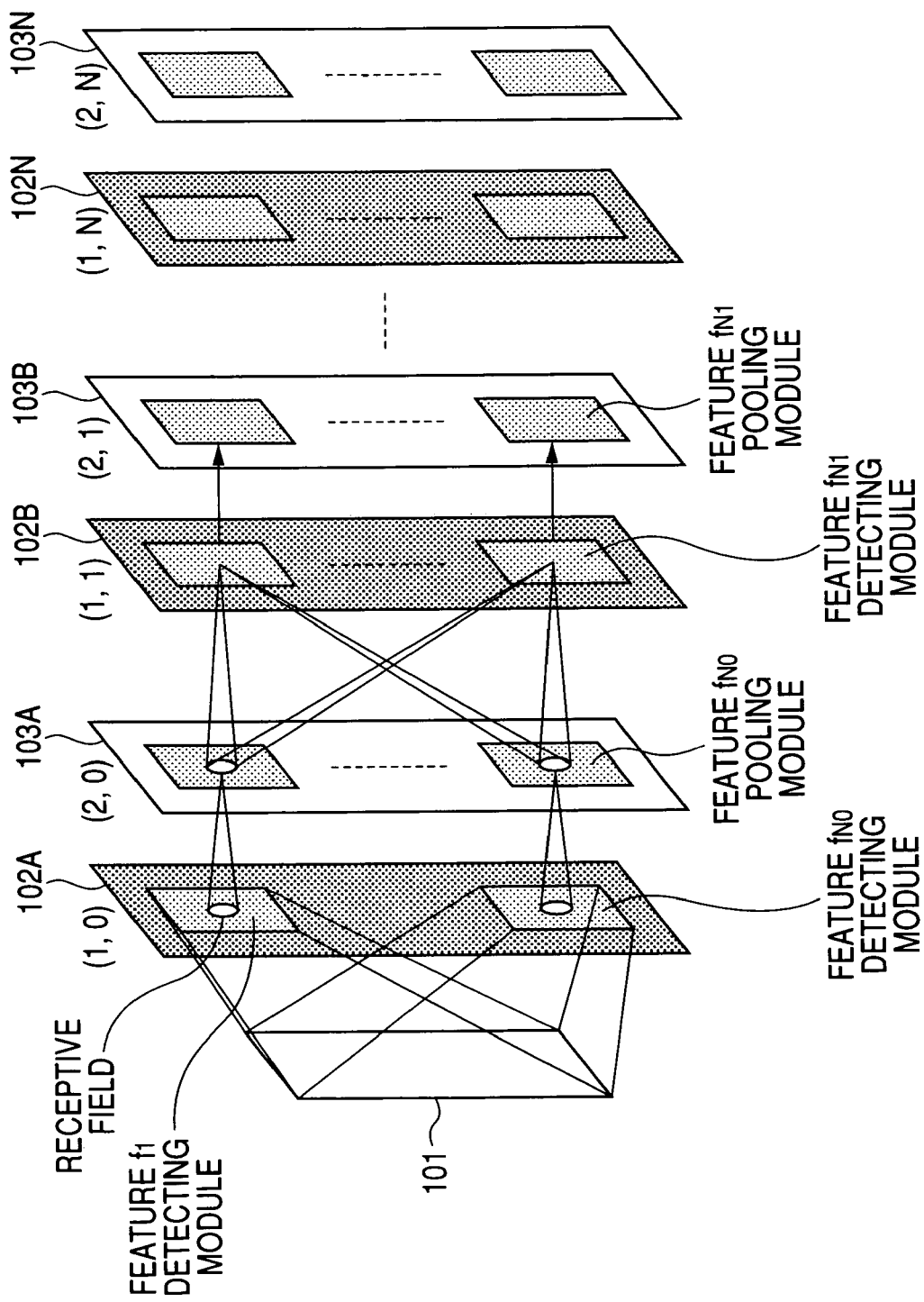
FIG. 1 is a diagram schematically showing an example of the overall configuration of a parallel hierarchical processing network for pattern detection and recognition according to a first embodiment of the present invention.

FIG. 1 is a diagram schematically showing an example of the overall configuration of a parallel hierarchical processing network for pattern detection and recognition. The parallel hierarchical processing network is a major component of a pattern recognition device, which incorporates a learning device for pattern recognition used in this embodiment. This pattern recognition device mainly processes information pertaining to recognition (detection) of an object or a geometric feature.

Figure 11:
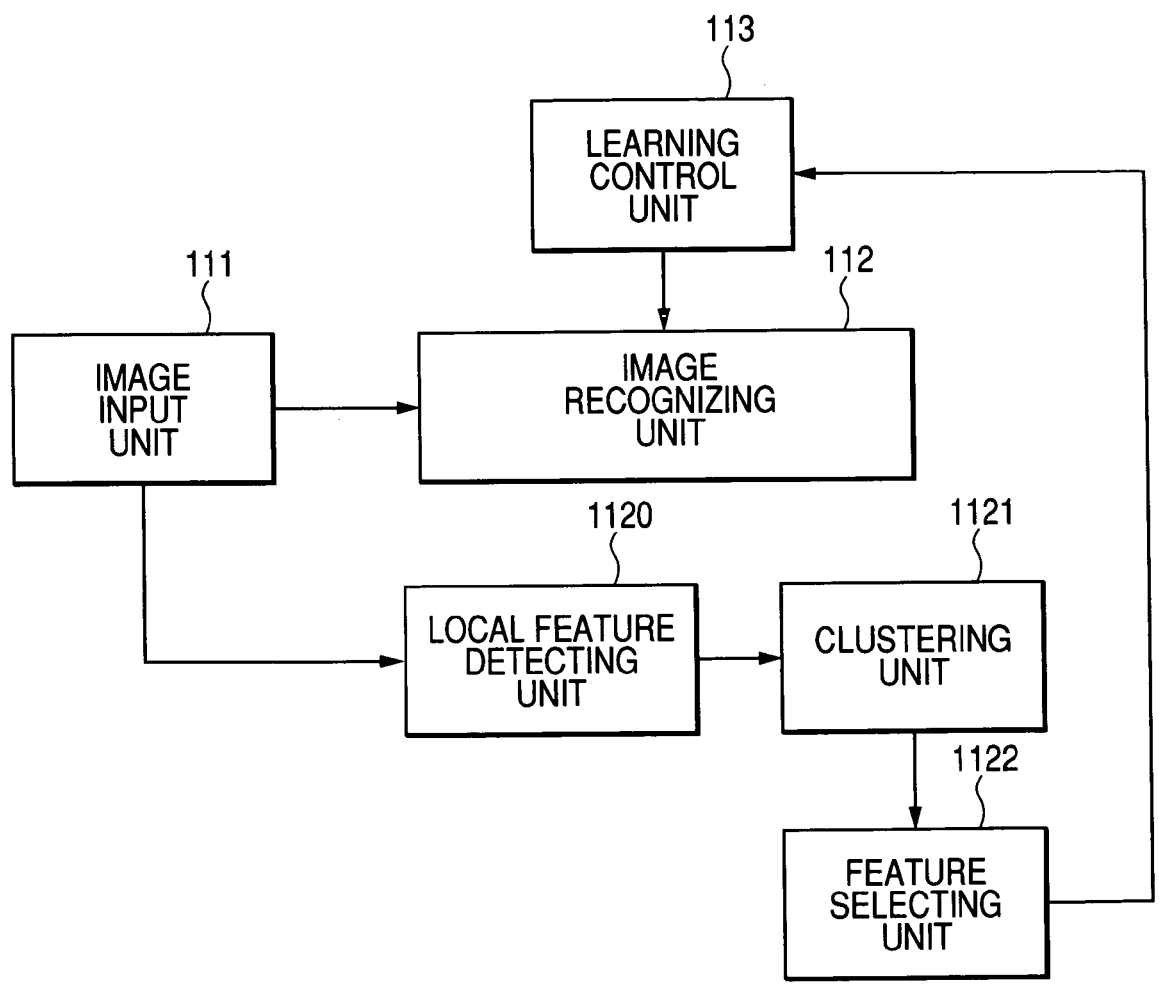
FIG. 11 is a block diagram showing an example of the configuration of a pattern recognition device.

FIG. 11 is a block diagram showing an example of the configuration of the pattern recognition device used in this embodiment.

The pattern recognition device in FIG. 11 contains as its critical parts an image input unit 111, an image recognizing unit 112, a learning control unit 113, a local feature detecting unit 1120, a clustering unit 1121, which performs clustering processing on results of the local feature detection by the local feature detecting unit 1120, and a feature selecting unit 1122, which selects a representative local feature based on results of the clustering processing by the clustering unit 1121.

The pattern recognition device is, for example, a microcomputer having a ROM in which a control program or the like is stored, a CPU which takes overall control of the pattern recognition device through execution of the control program, and a RAM which is used as, e.g., a work area when the CPU executes the control program.

Employed as the image input unit 111 is, for example, an image pickup device or an access terminal to access an external database or the like. The image input unit 111 inputs data containing images of different categories such as people and vehicles.

The image recognizing unit 112 performs hierarchical feature extraction processing in order to recognize image data inputted through the image input unit 111.

The local feature detecting unit 1120 detects, from the image data inputted through the image input unit 111, local feature data of several types which will be described later, and holds the image data.

The clustering unit 1121 performs clustering through self-organization mapping or the like on the several types of local feature data extracted by the local feature detecting unit 1120, to thereby classify the data into plural feature classes.

The feature selecting unit 1122 selects a representative feature class from the plural feature classes sorted by the clustering unit 1121.

The learning control unit 113 uses the representative local feature selected by the feature selecting unit 1122 as learning data of the image recognizing unit 112 (part of supervisor data) to perform supervised leaning, which will be described later.

FIG. 1 schematically shows the configuration of a so-called convolutional network that constitutes the image recognition unit 112. The distribution of final outputs reflects recognition results, namely, the category and detection position information of the recognized subject. For the configuration of a convolutional network, see an article by LeCun, Y. and Bengio, Y., titled "Convolutional Networks for Images, Speech and Time Series", Handbook of Brain Theory and Neural Networks (M. Arbib, Ed.), MIT Press, 1995, p. 255-258, for example.

In FIG. 1, a data input layer 101 holds data from a photoelectric conversion element in the image sensor (image input unit 111), such as a CMOS sensor or a CCD.

Images of different resolution levels are inputted in a first feature detecting layer 102A ((1, 0)). Local, low-order features (may include color component features in addition to geometric features) of an image pattern are detected at points throughout the entire screen (or at each one of given sampling points throughout the entire screen) which are located at the same positions in every screen. The detection is conducted on plural scale levels or plural resolution levels, and as many times as the number of feature categories. The feature detecting layer 102A ((1, 0)) is composed of neuron elements which have receptive-field architectures corresponding to feature amount types (in the case of extracting a line segment in a given direction as a geometric feature, the inclination of the line segment which is a geometric structure thereof).

Feature detecting layers 102 ((1, k), k≧0) together receive images of different resolution levels sequentially, to thereby create processing channels for plural resolution levels (or scale levels) each time. The feature detecting layers 102 then advance processing on the same scale level (or resolution level). Each neuron in the feature detecting layers 102 has a local receptive-field architecture (a local synaptic connection configuration for connection with the preceding layer) corresponding to the configuration of a pattern to be detected.

A feature integrating (feature pooling) layer 103A ((2, 0)) is composed of neuron elements having given receptive-field architectures (hereinafter, the term "receptive field" refers to the area of connection with an output element of the preceding layer and the term "receptive-field architecture" refers to the distribution of the connection load). The feature pooling layer 103A ((2, 0)) performs, as processing of integrating plural neuron outputs from the feature detecting layer 102A ((1, 0)) (within local receptive fields of feature integrating layer neurons), computation including sub-sampling by local averaging, or by maximum output extraction, or by other methods. In feature pooling layers 103, neurons in the same layer share a common receptive-field architecture irrespective of the type of a module (a feature to be detected).

Neurons in the feature detecting layers 102 ((1, 1), (1, 2), . . . , (1, N)) and in the feature pooling layers 103 ((2, 1), (2, 2), . . . , (2, N)) respectively have given receptive-field architectures. In the manner described above, the former layers ((1, 1), (1, 2), . . . , (1, N)) detect different features in their feature detecting modules and the latter layers ((2, 1), (2, 2), . . . , (2, N)) each perform the integration processing on detection results of plural features which are provided by its preceding feature detecting layer.

Neurons in the feature pooling layers 103 which are associated with plural geometric features at given positions (or in local regions surrounding the given positions) on input data are placed adjacent to one another, and each of the neurons is connected to a neuron in an upper level feature detecting layer.

Figure 9:
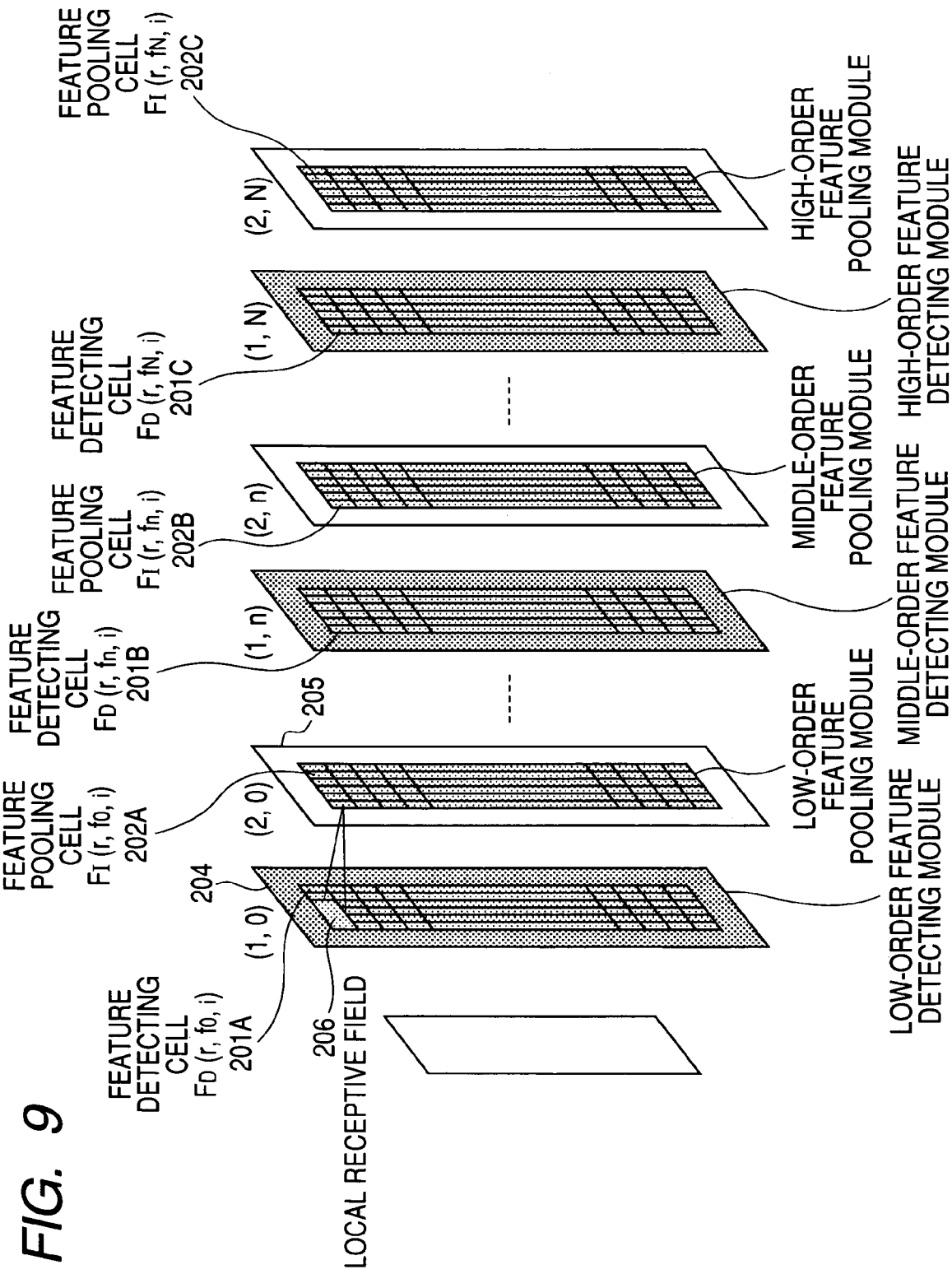
FIG. 9 is a diagram schematically showing an example of the overall configuration of a parallel hierarchical processing network for pattern detection and recognition.

Each of feature detecting cells 201 ($F_D(r, f_{k, i})$; (k≧0)) shown in FIG. 9 is a cell to detect an i-th feature category in a (k+1)-th feature detecting layer at a position corresponding to a location r on input data. Similarly, each of feature pooling cells 202 ($F_I(r, f_{k, i})$; (k≧0)) is a cell associated with an i-th feature category in a (k+1)-th feature detecting layer at a position corresponding to a location r on input data.

Unlike FIG. 1, each inter-layer connection in FIG. 9 has a local receptive-field architecture as schematically illustrated by a part of FIG. 9 where a connection from a low-order feature detecting layer 204 ((1, 0)) to a low-order feature pooling layer 205 ((2, 0)) is shown along with a local receptive field 206.

When a sum of products of a weight distribution coefficient and image data is inputted, outputs of neurons form a non-linear squashing function (typically a logistics function or a hyperbolic tangent function), or may form other non-linear functions (a non-monotone function, for example).

(Processing in Feature Detecting Layers)

Each neuron (or each group of neurons) in the feature detecting layer (1, 0) has a given spatial filter function. In this feature detecting layer (1, 0), plural neuron groups each made up of neurons whose receptive-field architecture corresponds to convolutional operation kernels that have the same scale level (resolution level) and different directivities together constitute one channel.

Neurons of the subsequent feature detecting layers ((1, 1), (1, 2), . . . ) differ from those of the feature detecting layer (1, 0) in that their receptive-field architectures for detecting features unique to a pattern to be recognized are created by supervised learning conducted for each module as will be described below. The size of the local region in which features are detected by one feature detecting layer, in other words, the receptive field size, is progressively larger than the receptive field size of the preceding feature detecting layer and approaches the overall size of the subject to be recognized, so that geometrically middle- or high-order features are detected.

Middle-order (or high-order) features in, for example, detection and recognition of a face are features on the graphic element level such as eyes, a nose, and a mouth which constitute the face. The receptive-field architectures of neurons in the feature detecting layers have excitatory and inhibitory connections in general (irrespective of whether it is for extraction of low-order features or high-order features). However, outputs of the neurons may be stabilized by a mechanism that receives an input of a shunting inhibitory connection in accordance with the output of the preceding feature extracting layer.

(Processing in Feature Pooling Layers)

Neurons of the feature pooling layers ((2, 0), (2, 1), . . . ) are now described.

As shown in FIG. 1, a connection from a feature detecting layer (for example, the feature detecting layer (1, 0)) to a feature pooling layer (for example, the feature pooling layer (2, 0)) is structured to receive an input of an excitatory connection from a neuron of the same feature element (type) in the preceding feature detecting layer which is within the receptive field of a neuron of this feature pooling layer. Neurons in a feature pooling layer have, as described above, a function of executing such calculation as sub-sampling by local averaging or maximum output extraction for each feature category.

Specifically, neurons in a feature pooling layer receives plural signals from neurons in a feature detecting layer that detects a feature of the same type, and integrate and average the inputted signals throughout a local region (receptive field) (or calculate a representative value of maximum values or the like in the receptive field), to thereby detect the feature with accuracy despite positional fluctuations and deformation of the feature.

(Processing of Selecting a Useful Local Feature Class)

Figure 2:
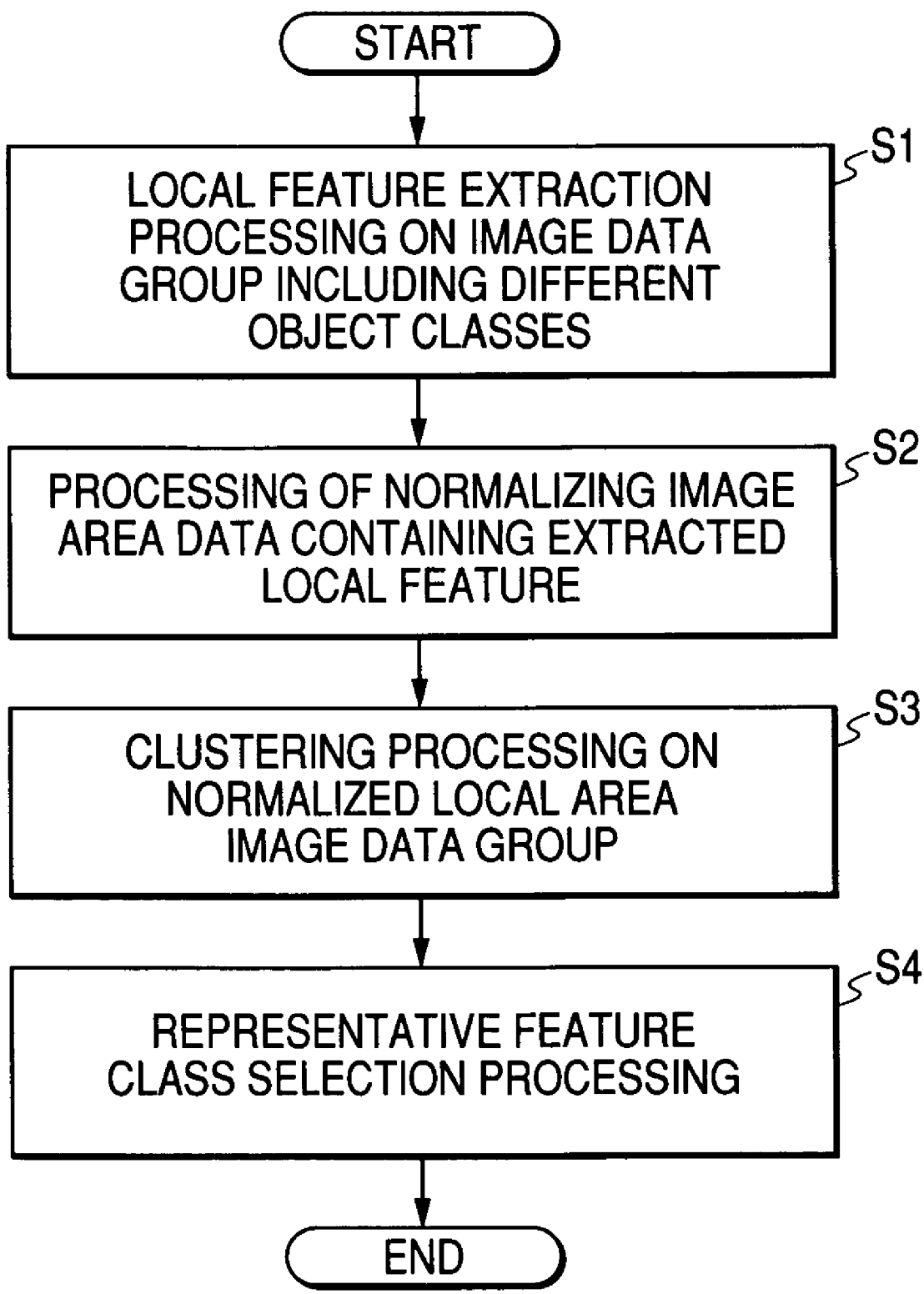
FIG. 2 is a flow chart illustrating a procedure example of processing of selecting a local feature useful for pattern recognition according to the first embodiment of the present invention.

Described next with reference to a flow chart of FIG. 2 is a procedure example of processing of selecting a local feature useful for pattern recognition which is the focus of the present invention.

The first step is to detect local features by running an interest operator or the like over an aggregation of input image data (each input image data) containing various object classes, which differ from one another in, for example, type, size, direction (angle), and shooting condition (Step S1).

Figure 3:
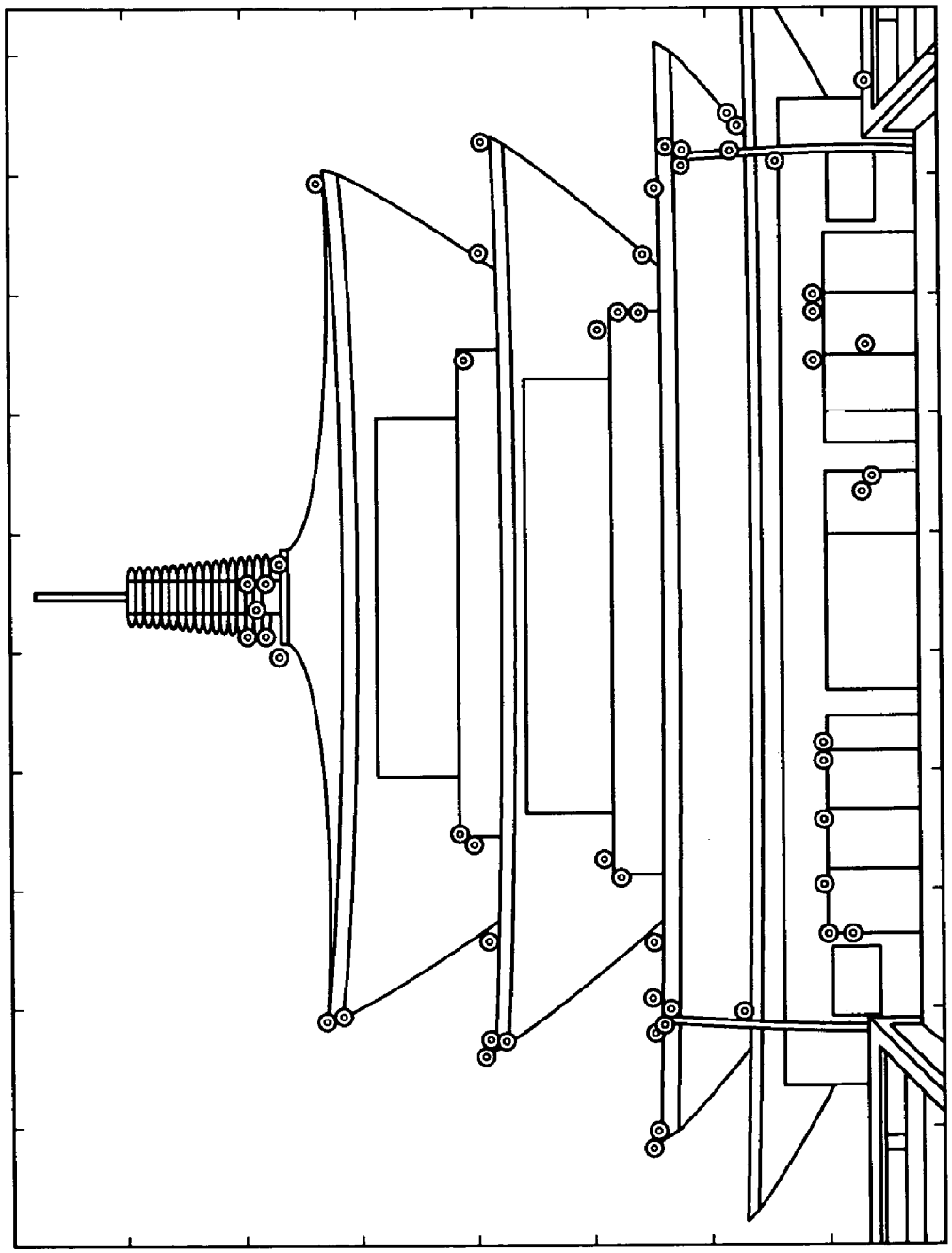
FIG. 3 is a diagram showing an example of a local feature extracted from an image which is run through an interest operator according to the first embodiment of the present invention.

FIG. 3 shows results of the feature detection. Circular symbols in FIG. 3 represent positions of the detected local features. References to interest operators can be found in such documents as Schmid, C., Mohr, R., Bauckhage, C. "Evaluation of Interest Point Detectors", International Journal of Computer Vision (2001), vol. 45, pp. 83-105, and Laptev, I. and Lindeberg, T. "Interest Point Detection and Scale Selection in Space-time", Proc. Scale Space Methods in Computer Vision, Lecture Notes in Computer Science (2003), pp. 372-387, Springer Verlag.

The next step is to perform normalization processing by histogram equalization, brightness normalization, or the like on an aggregation of images of a given size (for example, a 7×7 region) that contain the detected local features in order to reduce influence of illumination changes (Step S2). Then clustering such as self-organization mapping is performed (Step S3). Here, self-organization mapping (SOM) is employed to narrow the results down to a few, useful, local feature classes.

This embodiment uses, in input image normalization, an aggregation of facial images of people (300 images), images of vehicles on road viewed diagonally from the front (304 images), and other general images of buildings and landscapes (300 images) which are normalized in brightness range and run through an interest operator (the Harris operator) to obtain 69753 local features (features such as corners) (on the order of 60 local features per image). The facial images in the image data set used here include facial images of various sizes (144×108 to 296×220) and angles (e.g., −30°, 0°, and 30°).

Self-organization mapping is applied to the obtained local features. As a result, most of the local features are classified into a smaller number (on the order of 10) of feature classes, each of which contains several hundreds local features belonging thereto. The Euclidean distance between local feature images belonging to the same class is equal to or less than a given threshold. However, in general, plural images from object images of different categories are contained.

Next, representative feature classes are chosen from the sorting classes (Step S4). The representative feature classes chosen should have as little similarity with one another as to intersect with one another in a given feature space since, in some cases, representative local features of adjacent or neighboring classes obtained by self-organization mapping have great similarity even to human eyes.

Specifically, a distance measure for evaluating the similarity between features (for example, the Euclidean distance in a feature vector space) is introduced to choose features that are distanced from each other by a given threshold or more, or features that are well apart from each other to human eyes are chosen as representative features. The feature classes selected in this way each contains plural local features taken under different changes to a certain degree (size changes, angle changes, illumination changes, and the like).

Figure 4:
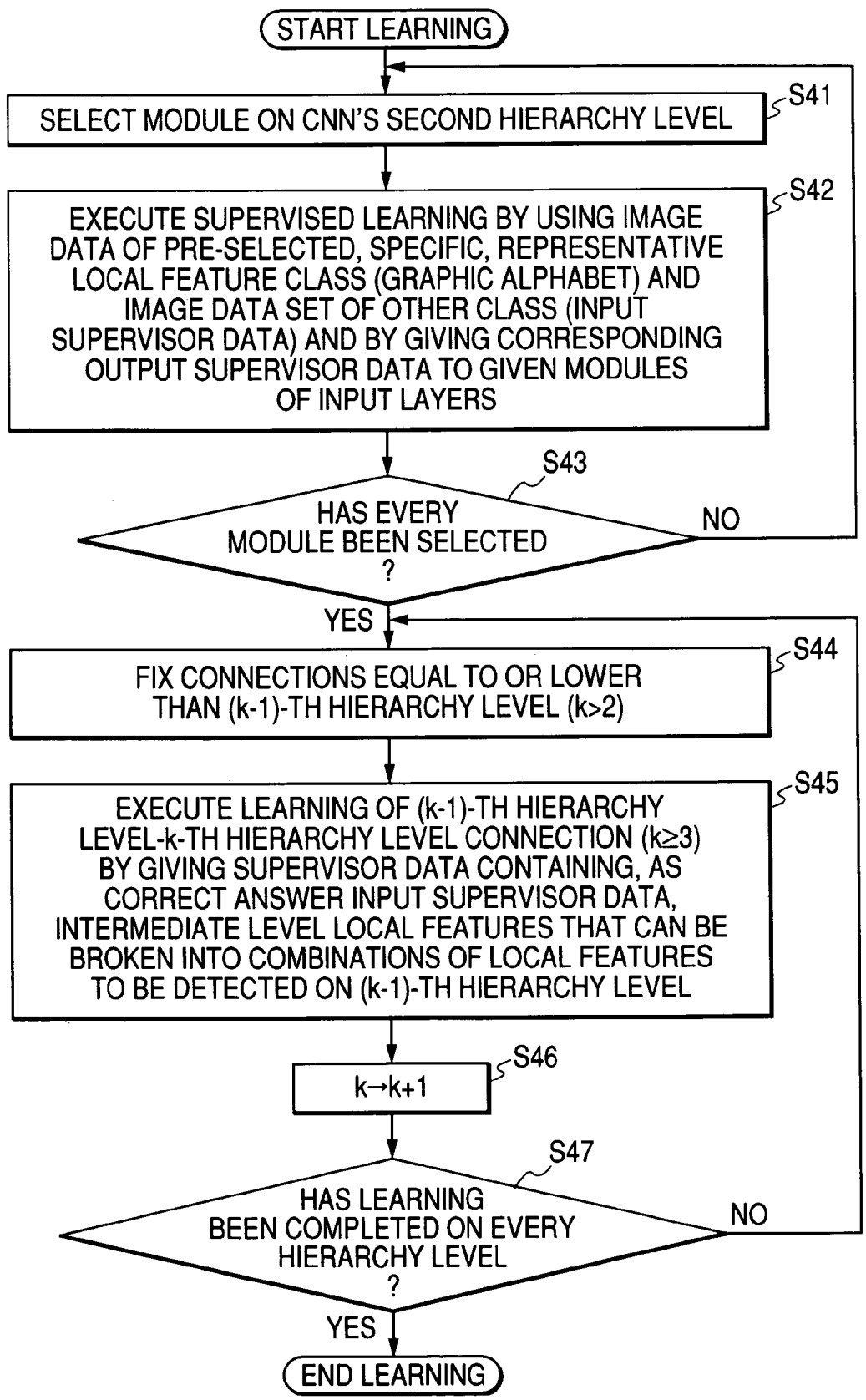
FIG. 4 is a flow chart illustrating an example of a learning procedure using local features according to the first embodiment of the present invention.

The local features selected as above are used in a learning procedure, an example of which is described with reference to a flow chart of FIG. 4.

Back propagation (hereinafter may be abbreviated as BP) is employed to execute supervised learning for each of modules of a feature detecting layer on a second hierarchical level of a convolutional neural network (hereinafter may be abbreviated as CNN), which constitutes a critical part of the pattern recognition device used in this embodiment, in a manner that makes neurons of each of the modules react selectively with local feature image data chosen as supervisor signals (Steps S41 to S43). This supervised learning uses local feature image data chosen as a correct answer learning image and image data of other classes as a wrong answer learning image.

In a feature detecting module whose hierarchical level is equal to or higher than 2 (i.e., hierarchical levels higher than the lower-most level), connections (receptive-field architectures of neurons) in hierarchical levels below the module's hierarchical level are fixed (Step S44) whereas connection patterns of neurons of this feature detecting module are made variable to execute supervised learning of connections between this hierarchical level and a hierarchical level immediately below (Step S45). These steps are repeated for upper hierarchical levels in an ascending manner until the learning is executed on every hierarchical level (Steps S46 and S47).

This embodiment uses, per class, image data of 50 different local features belonging to the class and a local image data set belonging to other classes in training by back propagation (BP). With cross-validation, four types of receptive-field architectures are formed for feature detecting neurons through learning which minimize error (for example, square mean error of outputs to evaluative input image data when the correct output to a correct answer image is 1 and the correct output to a wrong answer image is −1 or 0) in neurons being trained (neurons on the second hierarchical level or lower) and which are robust with respect to changes (the standard of robustness is set, for instance, such that the architectures allow a margin for a size change that approximately doubles the size and a margin for an angle change by about ±10°).

In the convolutional neural network (CNN), neurons that detect feature categories of the same class share the same receptive-field architecture (in other words, neurons that belong to the same module have the same receptive-field architecture).

In this embodiment, supervisor data are given for training to modules starting from a lower hierarchical level (specifically, the second hierarchical level) and then progressively advancing to upper hierarchical levels while minimizing error.

Supervisor data is a data set composed of a pair of input data and output data. When the input image is an image data set of a local feature to be detected by a module in question, a value corresponding to a firing state (1, for example) is given as output data of the module's neuron. On the other hand, when image data of other local features than the one to be detected by the module, a value corresponding to a non-firing state (−1, for example) is given as the output data.

In the case where the input data of supervisor data is image data of a local feature to be detected, the image data to be detected is of a graphic pattern which is obtained by extracting plural local features from groups of local features that are selected in advance by the above-described clustering (self-organization mapping) and then determining an appropriate space of the extracted local features from the positional relation, which constitutes a part of the subject to be recognized, and which is recognizable (discernible) to human (for instance, an eye region or a pupil region in a face). As in learning on the second hierarchical level, the output data is a value corresponding to a firing state when the input data is an image to be detected and a value corresponding to a non-firing state when the input data is wrong answer data, namely, other images than the one to be detected. The convergence of learning is judged by whether the absolute value of a value of an error curve (or, average moving deviations or mean inclination value) exceeds a given threshold or not.

Through the above example, it has been confirmed that the thus trained local feature detecting modules are robust to changes to a certain degree, and can make do with a chosen few local feature classes, and are effective for detection and recognition of different object categories (e.g., faces and vehicles).

As has been described, the learning according to this embodiment makes it possible to automatically obtain, for object detection or recognition, a few local feature classes (graphic alphabet) useful to depict (express) images of objects belonging to different classes which are taken under various shooting conditions.

In addition, receptive fields of feature detecting neurons in the convolutional neural network are created through supervised learning from the graphic alphabet and the intermediate feature classes which are obtained by training each module.

Second Embodiment

A second embodiment of the present invention is described next. In the second embodiment, detailed descriptions on portions identical to those in the first embodiment will be omitted.

Reference is made to a flow chart of FIG. 5, which shows an example of a learning procedure according to this embodiment.

Here, neurons on the second hierarchical level and lower of the same convolutional neural network (CNN) that is employed in the first embodiment are trained in the same manner as the first embodiment with the use of image data of objects of different categories (images of people's faces and of vehicles, for example) (Steps S51 to S53).

Thereafter, connections (receptive-field architectures) on the trained second hierarchical level and lower are fixed (Step S54). In automatic learning of connections of neurons in the feature detecting layers above the second hierarchical level, image data (in the case of vehicles, containing such data as a maker name and color) belonging to a category to be detected (in the case of vehicles, a sedan or hatchback viewed at a specific angle, for example) is given as correct answer supervisor data (corresponding to an event in which a neuron fires) to neurons of the uppermost feature detecting layer, whereas image data belonging to other categories is given as wrong answer supervisor data (corresponding to an event in which a neuron does not fire), and back propagation (BP) is applied (Step S55).

As a result, a feature detecting module capable of detecting an object in a specified category is formed in the uppermost feature detecting layer and, at the same time, modules for detecting intermediate features are automatically created in feature detecting layers on the intermediate hierarchical level above the second hierarchical level.

Third Embodiment

A third embodiment of the present invention is described next. In the third embodiment, detailed descriptions on portions identical to those in the first and second embodiments will be omitted.

Shown in this embodiment are a method of and a device configuration for automatically extracting useful intermediate local features which constitute a subject to be recognized and which are more intricate features obtained by combining selected local features.

Plural features are chosen from the aggregation of local features detected by the lowermost or second hierarchical level modules, which are created by training a convolutional neural network (CNN) according to the first and second embodiments, in other words, from the graphic alphabet. A given local spatial arrangement of the chosen features provides an aggregation of intermediate level graphic patterns (a sort of vocabulary in pattern recognition), which is considered as effective as the graphic alphabet in detection/recognition of objects of different categories.

In the first and second embodiments, the vocabulary aggregation is created by supervised learning in which an image of an object to be detected or a partial image of the object is given as part of correct answer supervisor image. In contrast, this embodiment selects a typical spatial arrangement for an arbitrary combination of letters of a graphic alphabet created by learning in advance, and calculates a logical sum, logical product (in the case of a binarized image), or weighted sum (in the case of gradation image data) of the graphic alphabet pattern images, to thereby create a new intermediate graphic pattern data set.

Reference is made to a flow chart of FIG. 6, which shows an example of a procedure of creating intermediate local features for use in training.

First, as in the first embodiment, an interest operator or the like is employed to extract aggregations of local features from an image data set containing various object classes (Step S61). The extracted local features are subjected to normalization processing (Step S62), and then clustering by vector quantization or self-organization mapping is performed on the normalized data (Step S63) to choose fewer, useful, local feature classes (Step S64).

Figure 7A:
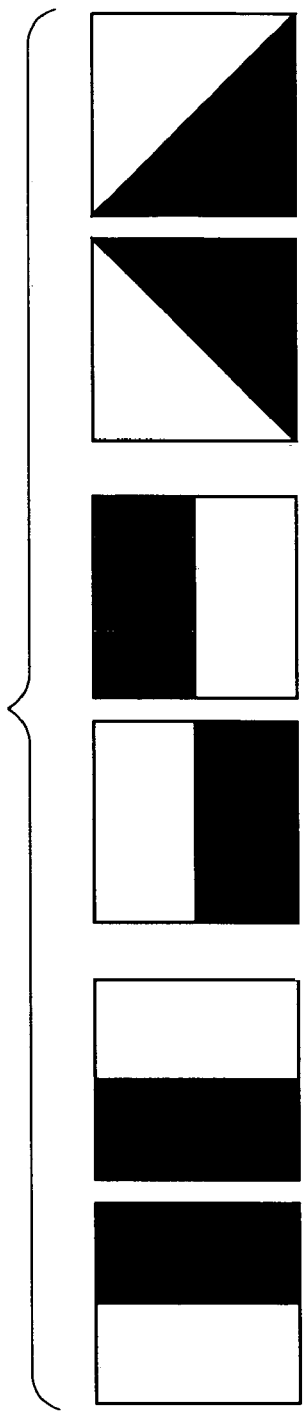
FIGS. 7A, 7B and 7C are diagrams showing examples of graphic alphabet patterns, the receptive-field architecture of corresponding local feature detecting neurons, and graphic alphabet models according to the third embodiment of the present invention.
Figure 7B:
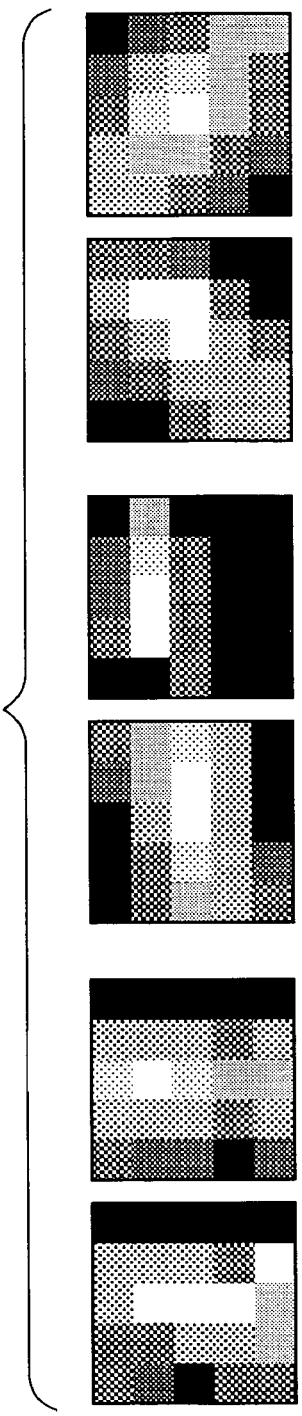
Figure 7C:
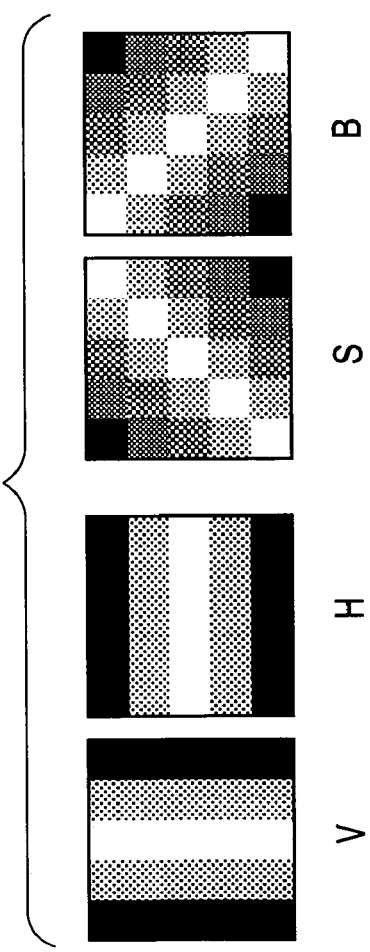
Figure 8:
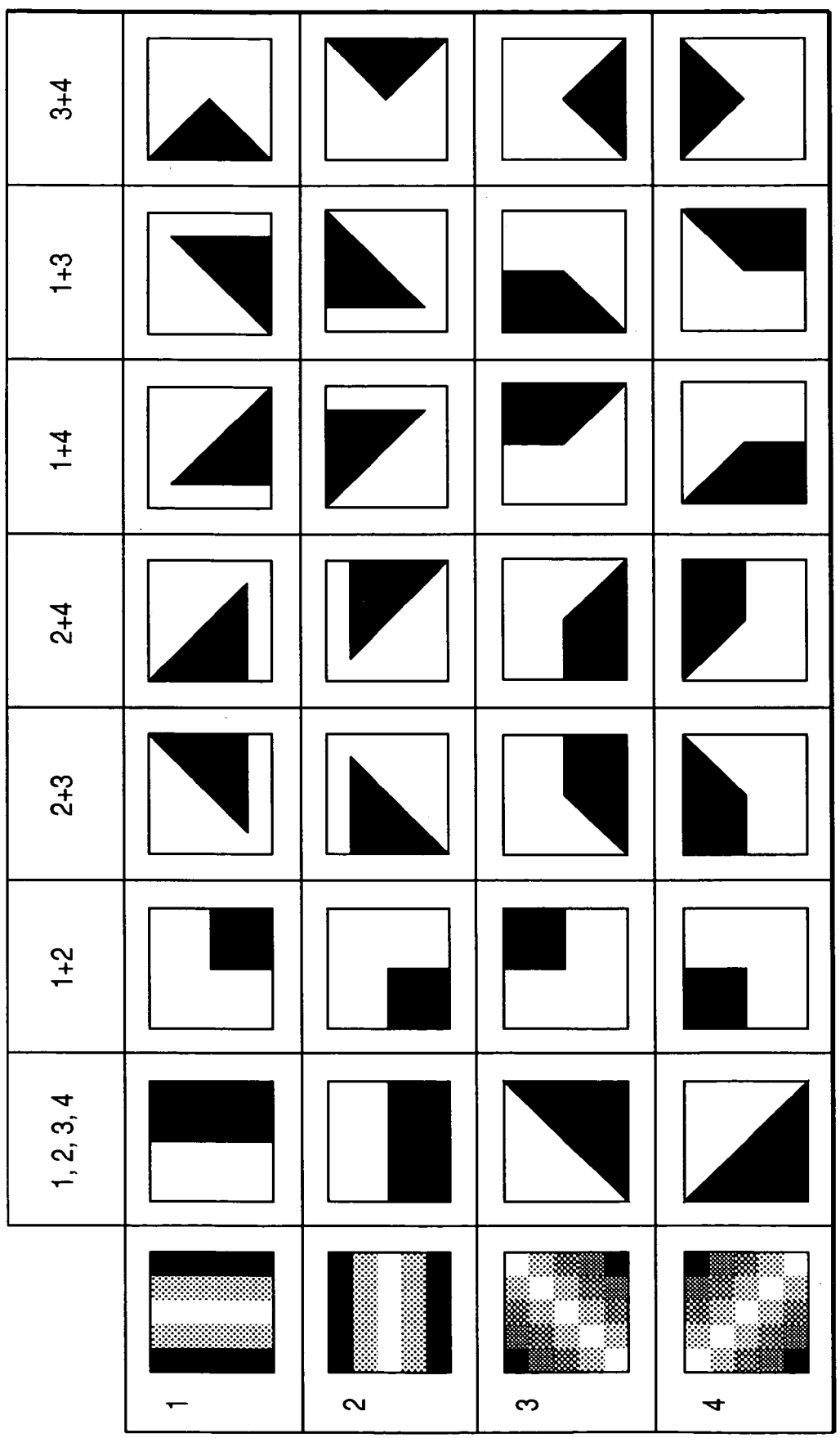
FIG. 8 is a diagram showing examples of created intermediate graphic patterns according to the third embodiment of the present invention.

The local feature classes selected here (graphic alphabet models) are as those shown in FIG. 7C and mainly include classes that are detected by the lowermost feature detecting layer in the convolutional neural network (CNN). An example of supervisor data used to form modules for detecting the local feature classes (graphic alphabet models) is shown in FIG. 7A. Typifying processing is performed on the local feature classes (Step S65) to obtain an aggregation of binarized feature patterns and their reversed feature patterns as those shown in FIG. 7A. FIG. 7B shows receptive-field architectures of neurons used to detect the respective binarized patterns. From the aggregation, two arbitrary pairs of local features are selected (Step S66), and a logical product (AND) or a logical sum (OR) is calculated while shifting the positions of the pairs in relation to each other by a certain amount (this amount is, in general, determined by the type of the intermediate feature to be detected, here, about the graphic alphabet size, for example) (Step S67). In this way, an aggregation of intermediate level graphic patterns (hereinafter referred to as intermediate graphic patterns for short) as the one shown in FIG. 8 is created.

The created intermediate graphic patterns can be used as correct answer input data, which constitutes supervisor data given to intermediate layer modules of the convolutional neural network. While, in practice, some of created intermediate graphic patterns may not be useful for detection of an object of a specific category, modules to detect features of intermediate graphic patterns that are determined by a possible arrangement of local feature combinations in relation to one another and that are exemplified in FIG. 8 are created, in advance, through learning, in association with as many feature types as necessary. Thus, feature detecting modules can be trained to detect only intermediate graphic patterns that are necessary for detection/recognition of specific categories (detection/recognition subject levels).

This is because, in supervised learning according to this embodiment, an excitatory connection of a neuron of a module that detects an intermediate graphic pattern useful to a specific object with a neuron of an object detecting module is enhanced whereas connections of the neuron of the object detecting module with neurons of modules that detect other useless intermediate graphic patterns are not enhanced (or, weakened or their inhibitory connections are enhanced).

As has been described, the learning according to this embodiment makes it possible to automatically obtain feature classes useful for detection and recognition of a specific object which are more intricate intermediate features (or high-order features) determined by a given spatial arrangement of letters of the obtained graphic alphabet in relation to one another.

<Image Pickup Device with a Pattern Recognition Device of the First through Third Embodiments>

Figure 10:
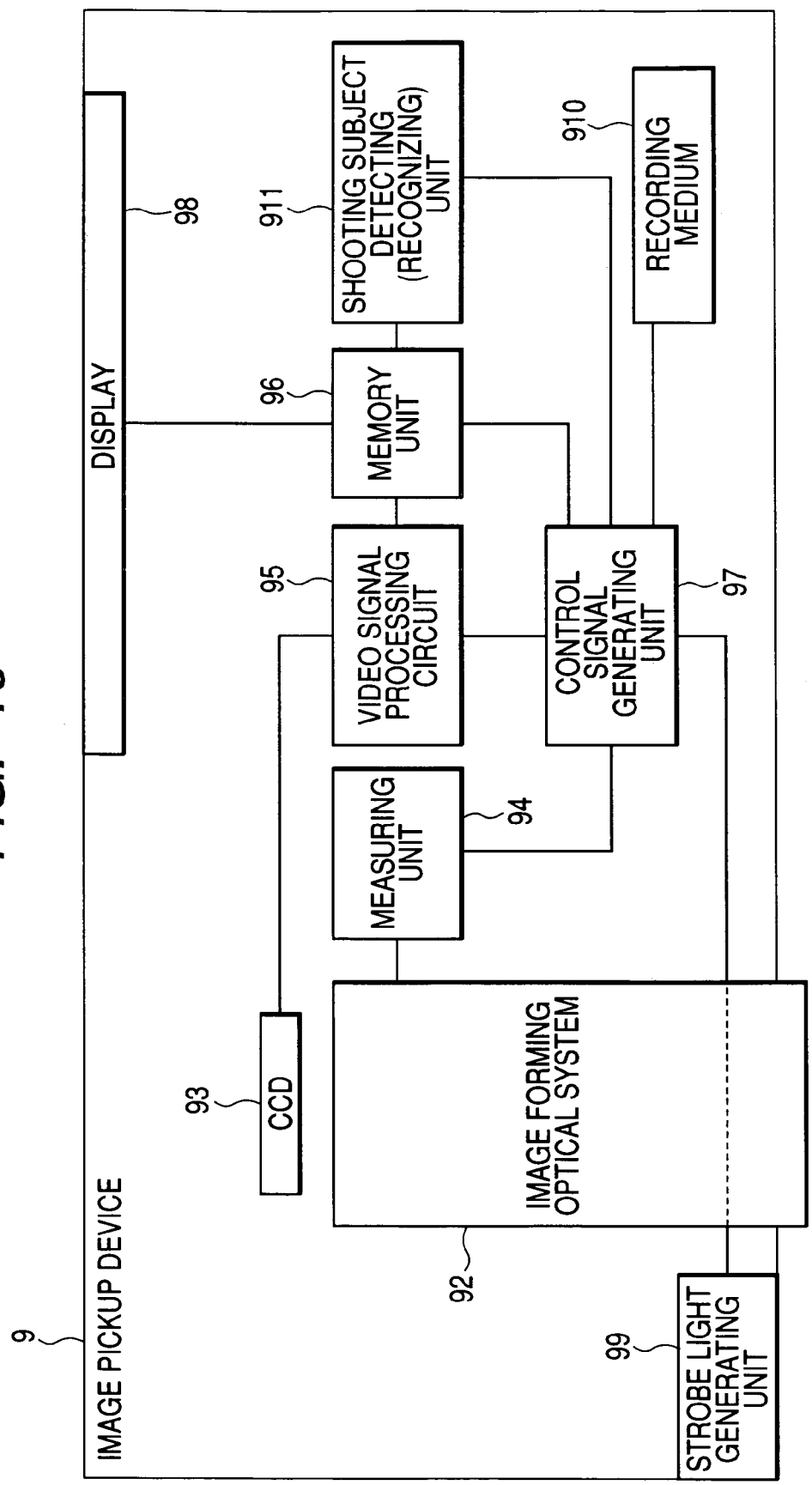

FIG. 10 is a block diagram outlining the configuration of an image pickup device that has a pattern recognition device according to the first through third embodiments. The basic components of the pattern recognition device are shown in FIG. 11.

An image pickup device 9 of FIG. 10 has an image forming optical system 92, which includes an image taking lens and a zoom photography drive control mechanism, a CCD or CMOS image sensor 93, an image pickup parameter measuring unit 94, a video signal processing circuit 95, a memory unit 96, a control signal generating unit 97, which generates a control signal for controlling shooting operations or conditions or the like, a display 98, which doubles as a finder such as EVF, a strobe light generating unit 99, a recording medium 910, a shooting subject detecting (recognizing) unit 911 (a pattern recognition device composed of a parallel pulse signal processing circuit with the hierarchical structure according to the above embodiments), etc.

The image pickup device 9 uses the shooting subject detecting (recognizing) unit 911 to detect, for example, (the location and size of) a facial image of a person registered in advance from images photographed. The location and size information of the person is inputted from the shooting subject detecting (recognizing) unit 911 to the control signal generating unit 97, which then generates, based on an output from the image pickup parameter measuring unit 94, control signals for optimum pint control, exposure condition control, white balance control and the like for the person.

With a pattern detection (recognition) device of the above embodiments thus applied to an image pickup device, a person or other shooting subject can be detected (recognized) precisely and quickly (real time) at low power consumption, and photographed under conditions (AF, AE and the like) that are optimized based on the detection result.

Although FIG. 10 shows as an example the case of loading the pattern recognition device in an image pickup device, other image input devices than an image pickup device, for example, a scanner, may have the pattern recognition device.

Other Embodiments of the Present Invention

Also included in the scope of the present invention are a computer in a system or an apparatus which is connected to various devices to operate the various devices and to thereby obtain the functions of the above embodiments, and software which provides a program code for executing the functions of the above embodiments to the computer (CPU or MPU) of the system or apparatus.

In this case, the program code of the software itself provides the functions of the above embodiments. Therefore, the program code and a measure to provide the computer with the program code, for example, a recording medium storing the program code, constitute the present invention. The recording medium storing the program code can be a flexible disk, a hard disk, an optical disk, a magneto-optical disk, a CD-ROM, a magnetic tape, a non-volatile memory card, a ROM or the like.

In addition to the case where the functions of the above embodiments are obtained by executing the program code provided to the computer, the program code embodies the present invention also when the functions of the above embodiments are obtained by cooperation between the program code and an OS (operating system) run on the computer or other application software.

Furthermore, the present invention includes a case where the provided program code is stored in a memory of an add-on board of the computer or of an add-on unit connected to the computer, a CPU or the like of the add-on board or of the add-on unit executes a part of or the entirety of actual processing as instructed by the program code, and the processing provides the functions of the above embodiments.

In learning according to the above-described embodiments, local features having given geometric structures are detected from image data of different types of objects, the detected local features are put through clustering, plural representative local features are selected based on results of the clustering, and a learning data set containing the selected representative local features as supervisor data is used to recognize or detect an object based on the object image data. Therefore, through the learning, a few local feature classes useful to depict (express) image data of different types of object can automatically be obtained for object detection or recognition.

Also, modules are trained to detect given features determined by a spatial arrangement of combinations of plural representative local features and, therefore, feature classes useful for detection and recognition of a specific object which are more intricate features can automatically be obtained.

Furthermore, given hierarchical levels of a convolutional neural network, in which feature detecting layers and feature pooling layers are arranged alternately, receive learning data for supervised learning and, therefore, receptive fields of feature detecting neurons of the convolutional neural network can be created by the supervised learning.

Moreover, data obtained by normalizing feature amounts of object image data inputted in the image input step is used as a learning data set and, accordingly, objects belonging to plural categories can be recognized and detected while receiving as little influence as possible from changes in subjects to be recognized.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

This application claims priority from Japanese Patent Application No. 2004-021823 filed on Jan. 29, 2004, which is hereby incorporated by reference herein.

What is claimed is:

1. A learning method for pattern recognition, comprising: using a processor to perform the steps of:
    an image input step of inputting an aggregation of different types of object image data;
    a local feature detection step of detecting local features that have given geometric structures from each object image data inputted in the image input step, wherein the local features are detected by feature detecting cells which detect a feature category at a position corresponding to a location on the image data, and wherein the local features are pooled by feature cells associated with the feature category at the position corresponding to the location on the image data;
    a clustering step of performing clustering on the local features detected in the local feature detection step so as to classify the local features into feature classes;
    a feature class selection step of selecting plural representative feature classes from the feature classes obtained in the clustering step so that respective representative local features of any two of the plural representative feature classes are distanced from each other by a predetermined threshold or more with respect to similarity; and
    a learning step of learning for recognition or detection of an object that corresponds to the object image data with the use of a learning data set, which contains as supervisor data the representative local features of the plural representative feature classes selected in the feature class selection step.

2. A learning method for pattern recognition according to claim 1, further comprising an image recognition step of recognizing or detecting an object that corresponds to the object image data based on results of the learning in the learning step.

3. A learning method for pattern recognition according to claim 1, further comprising an image recognition step to use a neural network in hierarchical parallel processing for recognition or detection of an object that corresponds to the object image data,
    wherein the representative features are about the local features on predetermined hierarchical levels.

4. A learning method for pattern recognition according to claim 1, wherein the clustering step uses vector quantization or self-organization mapping to perform clustering on the local features detected in the local feature detection step.

5. A learning method for pattern recognition according to claim 1, further comprising an image recognition step of performing hierarchical parallel processing using a convolutional neural network, where feature detecting layers and feature pooling layers are arranged alternately, for recognition or detection of an object that corresponds to the object image data,
    wherein, in the learning step, supervised learning is carried out by giving learning data to predetermined hierarchical levels of the convolutional neural network.

6. A learning method for pattern recognition according to claim 1, wherein the local feature detection step uses an interest operator to detect the local features.

7. A learning method for pattern recognition according to claim 5, wherein, in the learning step, supervised learning is carried out by giving the learning data to neurons of specific feature detecting modules on predetermined hierarchical levels of the convolutional neural network.

8. A learning method for pattern recognition according to claim 5, wherein, in the learning step, connections on a predetermined hierarchical level of the convolutional neural network and lower are fixed while supervised learning is carried out by giving the learning data to neurons on hierarchical levels above the predetermined hierarchical level.

9. A learning method for pattern recognition according to claim 5, wherein, in the learning step, the learning is carried out between neurons of specific feature detecting modules on a predetermined hierarchical level of the convolutional neural network and feature detecting neurons on its preceding hierarchical level.

10. A learning method for pattern recognition according to claim 1, wherein a predetermined feature determined by a spatial arrangement of combinations of the representative local features selected is detected as a result of the learning in the learning step.

11. A learning method for pattern recognition according to claim 1, wherein the learning step uses, as the learning data set, data obtained by performing predetermined normalization on feature amounts of object image data inputted in the image input step.

12. A learning method for pattern recognition according to claim 1, wherein the object image data of different types is image data of objects which belong to the same category and which are different from one another in at least one characteristic out of object size, angle, contrast and color balance.

13. A learning device for pattern recognition, comprising:
    image input means for inputting an aggregation of different types of object image data;
    local feature detection means for detecting local features that have predetermined geometric structures from each object image data inputted by the image input means wherein the feature detection is performed by feature detecting cells which detect a feature category at a position corresponding to a location on the image data, and wherein the local features are pooled by feature pooling cells associated with a feature category at the position corresponding to the location on the image data;
    clustering means for performing clustering on the local features detected by the local feature detection means so as to classify the local features into feature classes;
    feature class selection means for selecting plural representative feature classes from the feature classes obtained by the clustering means so that respective representative local features of any two of the plural representative feature classes are distanced from each other by a predetermined threshold or more with respect to similarity; and
    training means for training for recognition or detection of an object that corresponds to the object image data with the use of a learning data set, which contains as supervisor data the representative local features of the plural representative feature classes selected by the feature class selection means.

14. An image pickup device comprising:
    a learning device for pattern recognition according to claim 13; and detection means for detecting a shooting subject based on results of learning by the learning device for pattern recognition.

15. A computer-readable program stored on a computer-readable medium, for controlling a computer to perform learning for pattern recognition, the program comprising codes for causing the computer to perform:

an image input step of inputting an aggregation of different types of object image data;

a local feature detection step of detecting local features that have predetermined geometric structures from each object image data inputted in the image input step wherein the feature detection is preformed by feature detecting cells which detect a feature category at a position corresponding to a location on the image data, and wherein the local features are pooled by feature pooling cells associated with a feature category at the position corresponding to the location on the image data;

a clustering step of performing clustering, through a predetermined method, on the local features detected in the local feature detection step so as to classify the local features into feature classes;

a feature class selection step of selecting plural representative feature classes from the feature classes obtained in the clustering step so that respective representative local features of any two of the plural representative feature classes are distanced from each other by a predetermined threshold or more with respect to similarity; and a learning step of learning for recognition or detection of an object that corresponds to the object image data with the use of a learning data set, which contains as supervisor data the representative local features of the plural representative feature classes selected in the feature class selection step.

16. A computer-readable recording medium, which is used for recording a computer-readable program according to claim 15.

* * * * *